(12) United States Patent
Rana et al.

(10) Patent No.: US 9,918,146 B2
(45) Date of Patent: Mar. 13, 2018

(54) COMPUTING INFRASTRUCTURE OPTIMIZATIONS BASED ON TENSION LEVELS BETWEEN COMPUTING INFRASTRUCTURE NODES

(71) Applicant: Intel Corporation, Santa Clara, CA (US)

(72) Inventors: Annie Ibrahim Rana, Dublin (IE); Joseph Butler, Stamullen (IE); Thijs Metsch, Cologne (DE); Alexander Leckey, Kilcock (IE); Vincenzo Mario Riccobene, Leixlip (IE); Giovani Estrada, Dublin (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/018,211

(22) Filed: Feb. 8, 2016

(65) Prior Publication Data
US 2017/0230733 A1    Aug. 10, 2017

(51) Int. Cl.
*G08C 19/22* (2006.01)
*H04Q 9/00* (2006.01)
*H04L 29/08* (2006.01)

(52) U.S. Cl.
CPC ........... *H04Q 9/00* (2013.01); *H04L 67/10* (2013.01)

(58) Field of Classification Search
None
See application file for complete search history.

(56) References Cited

U.S. PATENT DOCUMENTS 9,521,067 B2 * 12/2016 Michael ................ H04L 45/123
9,621,646 B2 *  4/2017 Fu ........................ H04L 65/4076
2016/0182320 A1  6/2016 Bartfai-Walcott et al.

OTHER PUBLICATIONS

Leckyey et al., U.S. Appl. No. 14/757,775 entitled "Ranking System", filed Dec. 23, 2015; 34 ages.

* cited by examiner

*Primary Examiner* — Adolf Dsouza
(74) *Attorney, Agent, or Firm* — Patent Capital Group

(57) ABSTRACT

A system comprises a scoring engine comprising at least one processor and memory. The scoring engine is to generate, based on telemetry information obtained from a plurality of nodes of a computing infrastructure, a first availability score for a first node of the plurality of computing infrastructure nodes and a second availability score for a second node of the plurality of computing infrastructure nodes. The scoring engine is further to generate, based on the first availability score of the first computing infrastructure node and the second availability score of the second computing infrastructure node, an edge tension score for a link between the first node and the second node.

28 Claims, 7 Drawing Sheets

500

COMPUTING INFRASTRUCTURE OPTIMIZATIONS BASED ON TENSION LEVELS BETWEEN COMPUTING INFRASTRUCTURE NODES

FIELD

The present disclosure relates in general to the field of computer development, and more specifically, to computing infrastructure optimizations based on tension levels between computing infrastructure nodes.

BACKGROUND

An orchestrator may schedule workload placements in "the cloud" (e.g., in a computing infrastructure). Scheduling workload placement may include selecting a target compute host from a number of compute hosts. The workload may then be placed on the target compute host. A number of selection techniques may be utilized to select the target compute host, e.g., random selection, identifying and selecting a least-loaded compute host or randomly selecting a compute host from a plurality of compute hosts included in an availability zone. The number of compute hosts may be relatively large and the selection techniques may not necessarily make an optimum selection. For example, the orchestrator may place workloads onto target compute hosts based on a nominal capacity of each compute host before moving on to a next host (e.g., a bin packing scheduler). In another example, the orchestrator may consider only the compute resource and may ignore related resources such as network interfaces, memory architecture, etc.

BRIEF DESCRIPTION OF THE DRAWINGS

Like reference numbers and designations in the various drawings indicate like elements.

DETAILED DESCRIPTION

Figure 1:
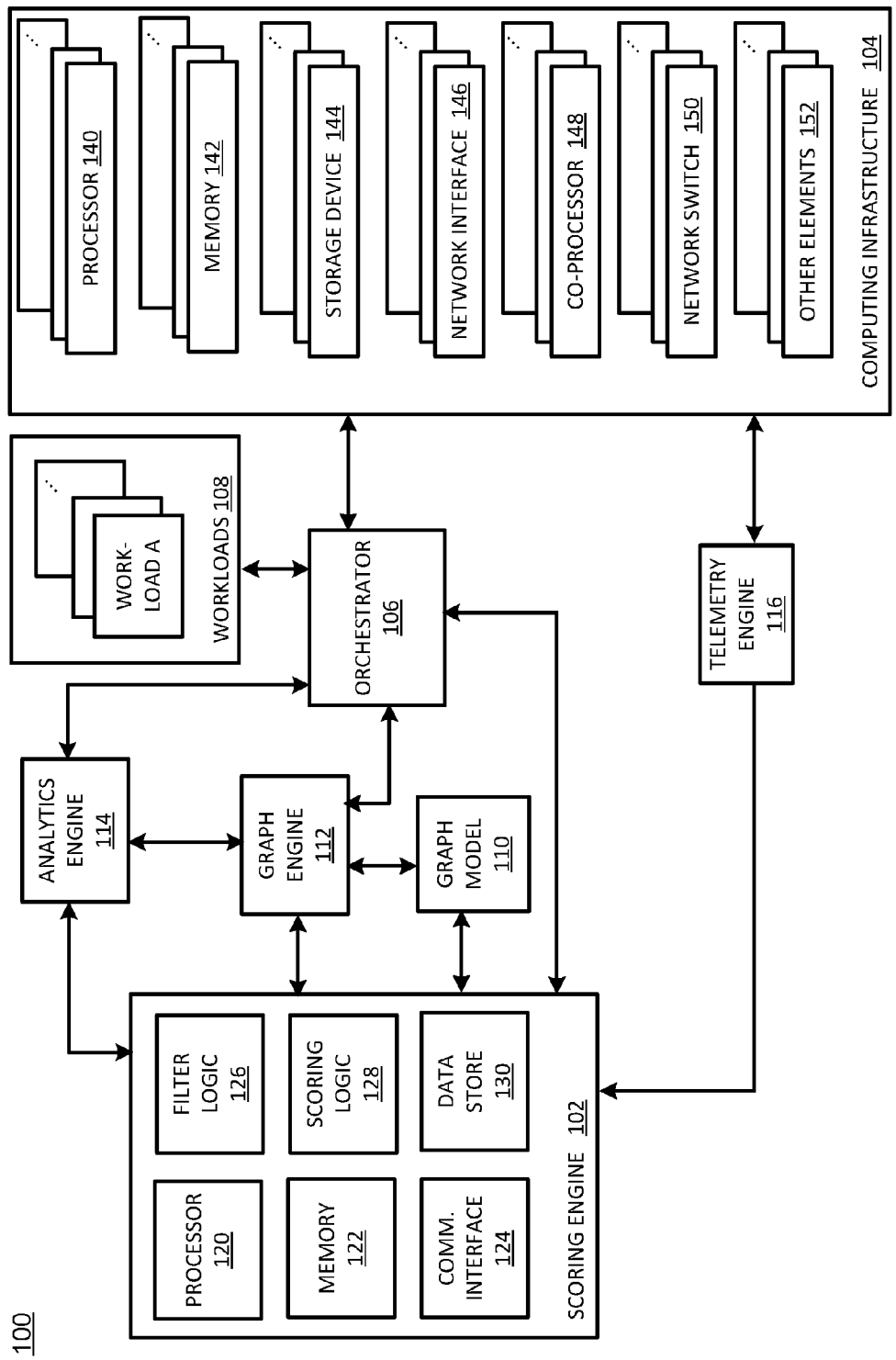
FIG. 1 illustrates a block diagram of a scoring engine, computing infrastructure, and associated systems in accordance with certain embodiments.

FIG. 1 illustrates a block diagram of a scoring engine 102, a computing infrastructure 104, and associated systems in accordance with certain embodiments. System 100 includes the scoring engine 102, computing infrastructure 104, an orchestrator 106, a graph model 110, a graph engine 112, an analytics engine 114, and a telemetry engine 116. System 100 may further include a plurality of workloads 108, e.g., workload A.

In various embodiments of the present disclosure, availability scores for various computing infrastructure nodes are generated. The availability scores may be used to determine the suitability of the nodes for receiving placement of one or more workloads. However, the availability scores are node specific and do not take into account interactions with neighboring nodes. Accordingly, various embodiments may also include generating edge tension scores for links between neighboring nodes. The edge tension scores may take into account the impact that neighboring nodes have on each other. For example, a poor edge tension score for a link may indicate that the link is highly stressed. The edge tension scores may be used to optimize initial workload placements, workload rebalancing, cost reductions, and other computing infrastructure operations. As one example, a logical machine comprising multiple physical elements (e.g., a processor, a memory, a network interface card, etc.) with minimum edge tension scores between its elements may be a primary candidate to receive additional workload. Similarly, a logical machine with higher edge tension scores between its elements may present an opportunity to optimize computing infrastructure performance by rebalancing one or more workloads to a different logical machine.

Computing infrastructure 104 includes a plurality of physical elements. The physical elements may include one or more processors, e.g., processor 140, one or more memories, e.g., memory 142, one or more storage devices, e.g., storage device 144, one or more network interfaces, e.g., network interface 146, one or more coprocessors, e.g., coprocessor 148, one or more network switches, e.g., network switch 150, and/or one or more other elements, e.g., other element 152. Other elements 152 may include any suitable physical elements of a computing infrastructure, such as power supply elements, cooling elements, or other suitable elements. In various embodiments, computing infrastructure 104 may represent any suitable combination of compute hosts comprising various physical elements. For example, computing infrastructure 104 may comprise a datacenter, a communications service provider infrastructure (e.g., one or more portions of an Evolved Packet Core), or other suitable group of compute hosts.

Processor 140 may comprise any processor or processing device, such as a microprocessor, an embedded processor, a digital signal processor (DSP), a network processor, an application processor, a system on a chip (SOC), or other device to execute code. Processor 140 may include any number of processing elements, which may be symmetric or asymmetric. In various embodiments, each processor 140 may further include (i.e., contain) a performance monitoring unit (PMU) configured to provide telemetry data associated with the processor.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Memory 142 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 142 may be used for short, medium, and/or long term storage by computing infrastructure 104. Memory 142 may store any suitable data or information utilized by other elements of the computing infrastructure 104, including software embedded in a computer readable medium, and/or encoded logic incorporated in hardware or otherwise stored (e.g., firmware). Memory 142 may store data that is used by cores of processors 140. In some embodiments, memory 142 may also comprise storage for instructions that may be executed by the cores of processors 140 or other processing elements of the computing infrastructure 104 to provide functionality associated with the computing infrastructure 104. Memory 142 may also store the results and/or intermediate results of the various calculations and determinations performed by processors 140 or other processing elements. In various embodiments, memory 142 may comprise one or more modules of system memory (e.g., RAM) coupled to the processors 140 through memory controllers (which may be external to or integrated with processors 140). In various embodiments, one or more particular modules of memory 142 may be dedicated to a particular processor 140 or other processing device or may be shared across multiple processors 140 or other processing devices.

Storage device 144 may include any suitable characteristics described above with respect to memory 142. In particular embodiments, a storage device 144 may comprise non-volatile memory such as a hard disk drive, a solid state drive, removable storage, or other media. In particular embodiments, a storage device 144 is slower than memory 142, has a higher capacity, and/or is generally used for longer term data storage.

Network interface 146 may be used for the communication of signaling and/or data between elements of computing infrastructure 104 and one or more I/O devices, one or more networks coupled to computing infrastructure 104, and/or one or more devices coupled through such networks to the computing infrastructure. For example, network interface 146 may be used to send and receive network traffic such as data packets. In a particular embodiment, network interface 146 comprises one or more physical network interface controllers (NICs), also known as network interface cards or network adapters. A NIC may include electronic circuitry to communicate using any suitable physical layer and data link layer standard such as Ethernet (e.g., as defined by an IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of computing infrastructure 104 and another device coupled to the computing infrastructure through a network.

Co-processor 148 may include any of the characteristics described above with respect to processor 140. In various embodiments, co-processor is a processor used to supplement the functions of processor 140. For example, co-processor may perform floating point arithmetic, graphics processing, signal processing, string processing, encryption, or I/O interfacing with peripheral devices.

Network switch 150 may couple to various ports (e.g., provided by NICs) of network interface 146 and may switch data between these ports and various components of computing infrastructure 104 (e.g., one or more Peripheral Component Interconnect Express (PCIe) lanes coupled to processors 140).

The elements of computing infrastructure 104 may be coupled together in any suitable manner, such as through a bus or other network. A bus may include any suitable interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Any of the elements of system 100 may be coupled together in any suitable manner such as through one or more networks. A network may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium. In various embodiments, an element of system 100 (e.g., orchestrator 106) may communicate through a network with external computing devices requesting the performance of processing operations to be performed by computing infrastructure 104.

One or more physical elements may be combined by, e.g., orchestrator 106, into a logical machine. For example, a first logical machine may be configured to include a processor 140, a memory 142, a network interface 146 and/or a coprocessor 148. In another example, a second logical machine may be configured to include a processor 140, a memory 142, and a network switch 150. A logical machine may include any combination and quantity of physical elements of computing infrastructure 104. Thus, computing infrastructure 104 may contain a plurality of configured logical machines, with each logical machine configured to contain one or more physical elements.

In a particular embodiment, a logical machine may include a plurality of physical elements existing on a common platform. In various embodiments, a platform may reside on a circuit board. In some embodiments, the circuit board is installed in a chassis, rack, or other suitable structure that comprises multiple platforms coupled together through a network (which may comprise, e.g., a rack or backplane switch).

A workload 108 may comprise a single virtual machine or multiple virtual machines operating together (e.g., a virtual network function (VNF) or a service function chain (SFC)), one or more container instances, and/or other suitable workload. Various embodiments may include a variety of types of guest systems present on the same logical machines or physical elements. In some embodiments, a workload 108 may be generated in response to system 100 receiving a request over a network from a remote computing device.

A virtual machine may emulate a computer system with its own dedicated hardware. A virtual machine may run a guest operating system on top of a hypervisor. The physical elements of a logical machine (e.g., processor 140, memory 142, storage device 144, network interface 146, co-processor 148, etc.) may be virtualized such that it appears to the guest operating system that the virtual machine has its own dedicated components. A virtual machine may include a virtualized NIC (vNIC), which is used by the virtual machine as its network interface. A vNIC may be assigned a media access control (MAC) address, thus allowing multiple virtual machines to be individually addressable in a network.

A VNF may comprise a software implementation of a functional building block with defined interfaces and behavior that can be deployed in a virtualized infrastructure. In particular embodiments, a VNF may include one or more virtual machines that collectively provide specific functionalities (e.g., wide area network (WAN) optimization, virtual private network (VPN) termination, firewall operations, load-balancing operations, security functions, etc.). A VNF running on computing infrastructure 104 may provide the same functionality as traditional network components implemented through dedicated hardware. For example, a VNF may include components to perform any suitable network function virtualization (NFV) workloads, such as virtualized Evolved Packet Core (vEPC) components, Mobility Management Entities, 3rd Generation Partnership Project (3GPP) control and data plane components, etc.

An SFC is group of VNFs organized as a chain to perform a series of operations, such as network packet processing operations. Service function chaining may provide the ability to define an ordered list of network services (e.g. firewalls, load balancers) that are stitched together in the network to create a service chain.

A hypervisor (also known as a virtual machine monitor) may comprise logic to create and run guest systems. The hypervisor may present guest operating systems run by virtual machines with a virtual operating platform (i.e., it appears to the virtual machines that they are running on separate physical nodes when they are actually consolidated onto a single hardware platform) and manage the execution of the guest operating systems. Services of the hypervisor may be provided by virtualizing in software or through hardware assisted resources that require minimal software intervention, or both. Multiple instances of a variety of guest operating systems may be managed by a hypervisor.

Graph model 110 corresponds to a model of computing infrastructure 104 that includes the plurality of logical machines, associated physical elements, and corresponding features as well as interconnections, interrelationships, and environmental features (i.e., deployment context). Graph model 110 may further include virtualized elements and/or placed services, e.g., workloads. The graph model may be stored in any suitable medium, such as any of the mediums described herein with respect to memories 122 or 142, storage device 144, or data store 130. Graph model 110 may be created and managed by graph engine 112. Graph model 110 may include information related to logical combinations of physical elements, virtual elements (e.g., virtual machines, hypervisors, or other virtual elements), virtual network elements (e.g., virtual switches, virtual network interfaces, virtual networks), container instances (e.g., one operating system and one or more isolated applications), workload elements (e.g., web server workloads, video processing workloads, database workloads) and/or service elements (e.g., management services, message queue services, security services).

The features included in graph model 110 may be element specific. For example, features associated with processors 140 or co-processors 148 may include one or more of a number of cores, processor speed, cache architecture, memory architecture (e.g., non-uniform memory access (NUMA)), instruction set architecture (ISA), etc. As another example, features associated with network interfaces may include bandwidth, number of physical ports, etc. As another example, features associated with memory 142 or storage device 144 may include bandwidth, size, latency, etc. Thus, graph model 110 corresponds to a representation of the configuration of the physical elements included in computing infrastructure 104 and their associated features.

Figure 2:
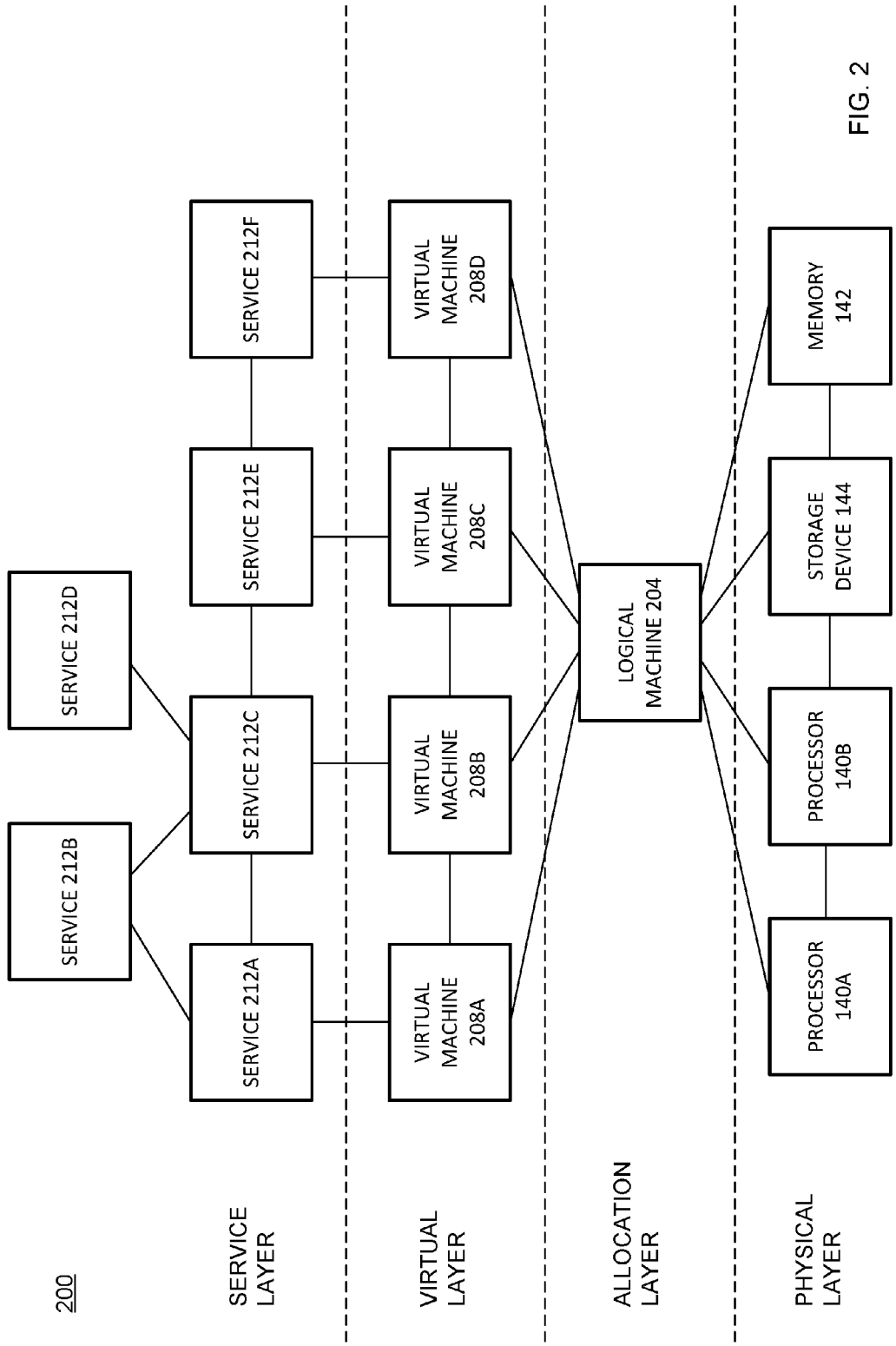
FIG. 2 illustrates an example portion of a graph model of a portion of a computing infrastructure in accordance with certain embodiments.

FIG. 2 illustrates an example portion of a graph model 200 of a portion of computing infrastructure 104 in accordance with certain embodiments. The graph model 200 depicts a plurality of computing infrastructure nodes and relationships among these nodes. In one embodiment, the computing infrastructure nodes are each associated with a layer, such as a physical layer, an allocation layer, a virtual layer, and/or a service layer. A computing infrastructure node may comprise a physical element (depicted by the nodes in the physical layer), a logical element comprising a logical grouping of physical elements (depicted as logical machine 204 in the allocation layer), a virtual element that may utilize the resources of logical element (depicted as virtual machine 208 in the virtual layer), or a service element (represented as service 212 in the service layer). In the embodiment depicted, processors 140A, 140B, storage device 144, and memory 142 are logically grouped together into logical machine 204. Logical machine 204 is used to run virtual machines 208. Various services 212 may be provided by the virtual machines.

Referring again to FIG. 1, telemetry engine 116 is operable to capture telemetry data from the nodes of the computing infrastructure 104. In some embodiments, the telemetry data is reported periodically to the telemetry engine. In particular embodiments, a critical event such as an overloaded resource (e.g, core) or an excessive temperature may be reported prior to the normal interval for reporting telemetry data (e.g., a notification may be sent immediately upon detection). The telemetry engine may communicate obtained telemetry data to other elements of system 100, such as scoring engine 102, orchestrator 106, or other suitable element.

Any suitable telemetry data may be collected. For example, the telemetry data may include, power information, performance parameters, security information, temperature information, utilization data, and location information of computing infrastructure nodes. As specific (but non-limiting) examples, the telemetry data may include processor cache usage, current memory bandwidth use, and current I/O bandwidth use by each guest system or component thereof (e.g., thread, application, service, etc.) or each I/O device (e.g., Ethernet device or hard disk controller). Additional telemetry data may include an amount of available memory space or bandwidth, an amount of available processor cache space or bandwidth, or available I/O bandwidth for each I/O device (e.g., storage device 144, network interface 146, network switch 150, etc.). In addition, temperatures, currents, and/or voltages may be collected from various points of the computing infrastructure, such as at one or more locations of each core, one or more locations of each processor 140, one or more locations of chipsets associated with the processors, or other suitable locations of the computing infrastructure 104 (e.g., air intake and outflow temperatures may be measured).

In one embodiment, telemetry engine 116 includes a performance monitor, e.g., Intel® performance counter monitor (PCM), to detect, for processors 140 or co-processors 148, processor utilization, core operating frequency, and/or cache hits and/or misses. Telemetry engine 116 may be further configured to detect an amount of data written to and read from, e.g., memory controllers associated with processor 140, co-processor 148, memory 142, and/or storage device 144. In another example, telemetry engine 116 may include one or more Java performance monitoring tools (e.g., jvmstat, a statistics logging tool) configured to monitor performance of Java virtual machines, UNIX® and UNIX-like performance monitoring tools (e.g., vmstat, iostat, mpstat, ntstat, kstat) configured to monitor operating system interaction with physical elements.

Orchestrator 106 is configured to activate, control and configure the physical elements of computing infrastructure 104. The orchestrator 106 is configured to manage combining computing infrastructure physical elements into logical machines, i.e., to configure the logical machines. The orchestrator 106 is further configured to manage placement of workloads onto the logical machines, i.e., to select a logical machine on which to place a respective workload and to manage logical machine sharing by a plurality of workloads. Orchestrator 106 may correspond to a cloud management platform, e.g., OpenStack® (cloud operating system), CloudStack® (cloud computing software) or Amazon Web Services (AWS). Various operations that may be performed by orchestrator 106 include selecting one or more nodes for the instantiation of a virtual machine, VNF, SFC, or other workload and directing the migration of a virtual machine, VNF, SFC, or other workload from particular physical elements or logical machines to other physical elements or logical machines. Orchestrator 106 may comprise any suitable logic. In various embodiments, orchestrator 106 comprises a processor operable to execute instructions stored in a memory and any suitable communication interface to communicate with computing infrastructure 104 to direct workload placement and perform other orchestrator functions.

Analytics engine 114 is configured to monitor performance of scheduled and placed workloads. Analytics engine 114 may be further configured to trigger a rebalancing of a selected workload if the selected workload is not meeting an associated performance target. In some embodiments, analytics engine 114 may trigger scheduling and placement of a workload that may initiate scoring and ranking operations, as described in further detail below.

In the embodiment depicted, scoring engine 102 includes one or more processors 120, memories 122, network interfaces 124, filter logic 126, scoring logic 128, and data store 130. Processor 120 may include any suitable combination of characteristics described herein with respect to processor 140, memory 122 may include any suitable combination of characteristics described herein with respect to memory 142, communication interface 124 may include any suitable combination of characteristics described herein with respect to network interface 146 or one or more communication buses, and data store 130 may include any suitable combination of characteristics described herein with respect to storage device 144.

Processor 120 is operable to perform operations of scoring engine 102. Memory 122 is operable to store data associated with operations of scoring engine 102. Communication interface 124 is configured to provide communication capability for scoring engine 102. For example, communication interface 124 may communicate using a wired and/or wireless communication channel with orchestrator 106, graph engine 112, analytics engine 114, and/or telemetry engine 116.

Operations of filter logic 126 may be initiated in response to receiving an indication of a workload to schedule from, e.g., orchestrator 106 and/or analytics engine 114. For example, the orchestrator 106 may provide notice of a new workload to schedule. In another example, analytics engine 114 may provide notice of an existing workload to be scheduled, related to rebalancing. In another example, workload rescheduling and placement may be triggered based, at least in part, on an elapsed time since a prior placement.

Filter logic 126 is configured to identify one or more attributes of the workload to be scheduled. Attributes may include, but are not limited to, whether the workload is computation intensive, whether the workload is memory access intensive, whether the workload includes one or more subsystems, expected utilization, etc. Attributes may further include resource requirements (e.g., special purpose processor), composition conditions (e.g., geographic location), and/or policy constraints (e.g., solid state devices with certain speed guarantees). In some situations, workload attributes may be known a priori.

One or more descriptors corresponding to workload attributes may be included with the workload. For example, a video encoding workload may be highly computationally (i.e., processor) intensive, thus, information related to a type of workload may provide workload attribute information. In some situations, workload attributes may not be known a priori. Some workload attributes may be learned over time and may thus be considered if a workload is rescheduled.

Filter logic 126 may be configured to identify features that correspond to identified workload attributes. Features may include physical element-related features and/or logical machine-related features. Physical element-related features may include, for example, processor speed, processor architecture, network interface bandwidth, memory architecture (e.g., NUMA), etc. Logical machine-related features are related to combinations of physical elements. Logical machine-related features may include, for example, availability of coprocessors (e.g., Intel® Xeon® Phi coprocessor), ISA, whether a physical network interface is local to a selected processor, dependent services running locally, etc. In various embodiments, filter logic 126 may receive telemetry data from telemetry engine 116 and may determine features or other information based on the telemetry data.

Dependent services running locally may be related to the logical machine and/or the environment that includes the logical machine. For example, a dependent service running locally may include availability of a network switch to a logical machine. In another example, for a workload that processes data (i.e., attribute is processes data), a dependent service running locally may include proximity of memory and/or storage to a processor, i.e., proximity of the data. Dependent services running locally may further include compositional information, e.g., the workload needs to be all in one rack, all in one server or, for fault tolerance, distributed over multiple computing infrastructures.

Filter logic 126 may identify nodes included in computing infrastructure 104 that have the identified features. For example, filter logic 126 may be configured to access graph model 110 directly and/or graph model 110 via graph engine 112, to identify the nodes. Filter logic 126 may be configured to identify logical machines in computing infrastructure 104 that have one or more of the identified features.

In one embodiment, only those physical elements and/or logical machines that have the identified features may then be scored and/or ranked, as described further below. Such filtering may facilitate "real time" scoring of physical elements and/or logical machines by scoring only those physical elements and/or nodes that have the identified features in order to preserve computing resources. In other embodiments, any suitable physical elements and/or logical machines may be scored and/or ranked at any suitable interval.

Filter logic 126 may be configured to identify one or more logical machine(s) that contain the identified elements. Filter logic 126, scoring logic 128 and/or orchestrator 106 may then acquire an availability score and/or one or more edge tension scores for each identified logical machine. In some embodiments, the scores may be determined prior to receiving an indication of a workload to schedule.

Scoring logic 128 is configured to determine availability scores for computing infrastructure nodes. For example, scoring logic 128 may determine scores for each identified physical element and for logical machines that include one or more identified physical elements. As another example, scoring logic 128 may determine a score for nodes in the virtual layer, such as a virtual machine. Scoring logic 128 may also determine edge tension scores between nodes. Operations of scoring logic 128 may be performed periodically and/or in response to requests and results may be stored to, e.g., data store 130. The scores are based, at least in part, on telemetry data provided by telemetry engine 116.

Scoring logic 128 and/or orchestrator 106 may also be configured to select a logical machine for placement of the received workload (e.g., workload A) based on the scores determined by scoring logic 128. In one example, scoring logic 128 may be configured to provide one or more logical machine identifiers and associated availability scores and/or edge tension scores to orchestrator 106. In one embodiment, the logical machine identifiers and associated scores may be provided in an ordered list, i.e., ranked, from highest availability score to lowest availability score or from lowest edge tension score (or the best metric based on a combination of edge tension scores for links of the node) to highest edge tension score (or the worst metric based on a combination of edge tension scores for links of the node). In another example, scoring logic 128 may be configured to provide the logical machine identifier(s) associated with the best availability score and/or edge tension score(s) to orchestrator 106. Orchestrator 106 may then be configured to schedule, i.e., place, the received workload to the appropriate logical machine(s).

Scoring logic 128 is configured to determine availability scores for physical elements, logical machines, virtual machines or other workloads, and associated edge tension scores periodically or in response to a request or data received from another element of system 100 (e.g., orchestrator 106, graph engine 112, or telemetry engine 116). The scores may be stored to, e.g., data store 130 and/or may be stored to graph model 110.

In various embodiments, the acquired telemetry data may include utilization, saturation, and capacity parameters (or such parameters may be derived from the acquired telemetry data). An availability score of a node or an edge tension score for a link between two nodes may be based on a combination of any suitable factors, such as one or more utilization parameters of the node, one or more saturation parameters of the node, one or more capacity parameters of the node, and/or other suitable factors. In various embodiments, the factors used to determine the scores may be determined based on telemetry data provided by the telemetry engine 116 or other source (e.g., a device used by a computing infrastructure administrator).

A utilization parameter of a node may indicate the utilization of the node. The utilization may be based, at least in part, on a maximum capacity of the node (with respect to one or more parameters associated with the node) and an amount of the capacity of the node that is in use during a particular time or interval. The utilization may correspond to an average amount of work performed by a node during a time interval with respect to the amount of work that could be performed by the node. The utilization of a node for each data acquisition interval may correspond to an average of the utilization determined over the time interval. As one example, a utilization parameter of a node may be defined as $$U_x^{t_1-t_2} = \frac{avg(\text{Output})_x^{t_1-t_2}}{Capacity_x^{t_1-t_2}}$$

where $U_x^{t_1-t_2}$ is utilization of node x in a time period $t_1$-$t_2$, and avg is an average. The utilization (as measured by the output and capacity) of a node may be dependent on the type of node. For example, the utilization of a processor 140 may correspond to a ratio of the number of active cores to the total number of cores included in the processor. In another example, for a processor core, utilization may correspond to a ratio of a current number of processor cycles to a maximum number of processor cycles in a time interval. In another example, the utilization of a memory 142 or storage device 144 may correspond to an amount of the storage space being used with respect to the amount of available storage space or an I/O bandwidth of the memory or storage device that is being used with respect to the maximum I/O bandwidth. In another example, for a network interface 146, the utilization may correspond to a ratio of bandwidth being utilized to the maximum bandwidth of the network interface. Any suitable types of output and capacity parameters may be used to calculate a utilization parameter of a node.

In various embodiments, the utilization of a particular node may be based on multiple different parameters associated with the node. For example, the utilization of a memory 142 could be based on the amount of memory used as well as the amount of bandwidth used. As another example, the utilization of a logical machine may be based on the utilization of one or more of its associated physical elements. In particular embodiments, an average (e.g., a weighted average) may be taken across multiple utilizations measured using multiple output parameters and associated maximum capacities to determine the utilization of a node. In other embodiments, a minimum or maximum utilization (measured for a particular output parameter and capacity) of multiple utilizations measured using various different output parameters and capacities may be used to determine the utilization of the node. Other embodiments may include any other suitable methods for calculating a utilization of a node along multiple different output parameters and capacities. For example, measurements for utilization of a logical machine may be based on data gathered by a telemetry agent installed on a physical compute host corresponding to the logical machine. The utilization may be measured using any suitable combination of one or more parameters such as bandwidth, storage size, or other parameter of the compute host as a whole or as a combination of various physical elements of the compute host. As another example, measurements for utilization of a virtual machine may be based on observations regarding various elements in the virtual layer (e.g., processes associated with each virtual machine), and may be based on any suitable parameters for the processes (e.g., usage of various resources allotted to the virtual machine, such as processing or data transfer bandwidth, storage space, etc.). As yet another example, measurements for utilization of a service may be based on the number of requests made by the service over a period of time (e.g., Hypertext Transfer Protocol (HTTP) requests/second).

A saturation parameter of a node may indicate the saturation of the node. A saturation is a measure of the level of saturation of a node. Saturation may indicate whether the node has extra work that it cannot immediately service. If a node cannot immediately service a job, then the job may be queued until the node is able to service it. As one example, saturation of a node may be defined as $$S_x^t = \frac{\text{Queued\_Jobs}_x^t}{\text{Total } \textit{Jobs}_x^t}$$

$$S_x^{t1-t2} = \frac{\text{number of samples in which } S_x^t > 0}{\text{total number of samples}}$$

where $S_x^t$ is saturation in a time instance t, and $S_x^{t1-t2}$ is saturation of node x in a time period $t_1$–$t_2$. Thus saturation for a particular time instance may be determined by dividing the number of queued jobs by the total number of jobs received but not yet completed by the node (e.g., the jobs may be queued or in process) and saturation for a time interval may be determined by adding up the number of samples in which the saturation of a particular time instance was greater than zero and dividing by the total number of samples taken over the time interval.

Unlike utilization, saturation corresponds to a state, i.e., saturated or not saturated. Thus, raw saturation data may not provide an appropriate measure between zero and one. Accordingly, an example saturation parameter $S_x^{t1-t2}$ may be defined as a ratio of a count of a number of samples where the node was saturated (i.e., had queued jobs) to the total number of samples over the look back period. If no saturation is present, then the example saturation parameter is zero. If the node was saturated for the entire look back period, then the example saturation parameter is one. Thus, at least in some embodiments, a saturation parameter may have a value between zero and one, inclusive (in other embodiments other suitable scales may be used).

A capacity parameter of a node may indicate a capacity associated with the node. In various embodiments, the scores calculated by the scoring logic 128 may be based on a capacity factor. A capacity factor of a node may indicate an amount of node capacity available for use. In various embodiments, the capacity factor has a range of zero to one (though any suitable scale may be used), inclusive, where zero corresponds to no capacity available and one corresponds to full capacity available. Capacity factor values between zero and one may provide a weighting factor to the score calculation. The capacity factor may be based on various capacity parameters, such as a nominal capacity, a guard capacity, a potential capacity, and/or a sold capacity.

A nominal capacity may correspond to one or more physical capacities of a physical element. For example, for a processor 140, the physical capacity may correspond to the number of cores, a processor speed, a number of threads, etc. In another example, for a network interface, the physical capacity may correspond to the bandwidth of the network interface. In another example, for a storage device or memory, the physical capacity may correspond to disk space. In various embodiments, the nominal capacity may be derived from the specification of the physical element. As one example, an agent may read various details about a physical element from the system configuration (e.g., how many cores a processor has, how many Gbps a NIC is able to send/receive, etc.). The nominal capacity of a higher level node, such as a logical machine, virtual machine, or service may be based on the nominal capacity of one or more physical elements that form the higher level node or that are used by the higher level node.

A sold capacity indicates an amount of capacity that has been allocated for use. In one embodiment, sold capacity may be expressed based, at least in part, on a nominal capacity and based, at least in part, on an amount of capacity that is allocated. For example, a computing infrastructure administrator may sell more capacity than a node (e.g., physical element, logical machine, and/or virtual machine) possesses (i.e., implement oversubscription). A resource that is oversold has an allocated capacity greater than a nominal capacity. In other words, more workloads may be placed on a resource than the physical capacity of that resource can support at one time. The resource may then be shared by a plurality of workloads in time slices. As sold capacity increases, performance may be degraded and SLA violations may increase.

Sold capacity may be determined based, at least in part, on an indication of allocated capacity acquired from, e.g., orchestrator 106. For example, an instantaneous allocated capacity may be acquired at each sample interval. An average allocated capacity may then be determined for the look back period. In a particular embodiment, sold capacity is expressed as allocated capacity divided by nominal capacity.

A guard capacity is a guard factor multiplied by the nominal capacity. The guard factor is greater than or equal to one. The guard factor is configured to represent risk, i.e., a risk that an associated resource is sufficiently oversold that a service level agreement (SLA) may be violated. The guard factor may be selected and/or determined by, for example, a computing infrastructure administrator. If the sold capacity is less than the guard capacity and greater than the nominal capacity, then the amount oversold is not considered a risk. For example, if the guard factor is equal to 2, then a sold capacity less than twice the nominal capacity may not be considered a risk by the computing infrastructure administrator. The value of the guard factor may be determined by the computing infrastructure administrator based, at least in part, on policy.

Similar to the guard capacity, the potential capacity equals a potential factor multiplied by the nominal capacity. The potential capacity corresponds to a maximum allowable sold capacity. The potential capacity is typically greater than the guard capacity. The potential factor may be set by any suitable individual or element of system 100, e.g., orchestrator 106. For example, for OpenStack®, a maximum potential factor for a processor is 15, thus, allowing a sold capacity for processors and associated cores that is 15 times the actual physical capacity. In other words, as many as 15 virtual cores may be associated with one physical core. Risk associated with a sold capacity between the guard capacity and the potential capacity may increase as the sold capacity increases. In various embodiments, sold capacity greater than the potential capacity is not allowed.

In one embodiment, the capacity factor may be defined as $$C_x = \begin{cases} 1 & \text{if sold} \leq \text{guard [or sold} = NA] \\ \left(\frac{\text{Nominal}}{\text{Sold}}\right) & \text{if guard} < \text{sold} \leq \text{potential} \\ 0 & \text{otherwise} \end{cases}$$

Figure 3:
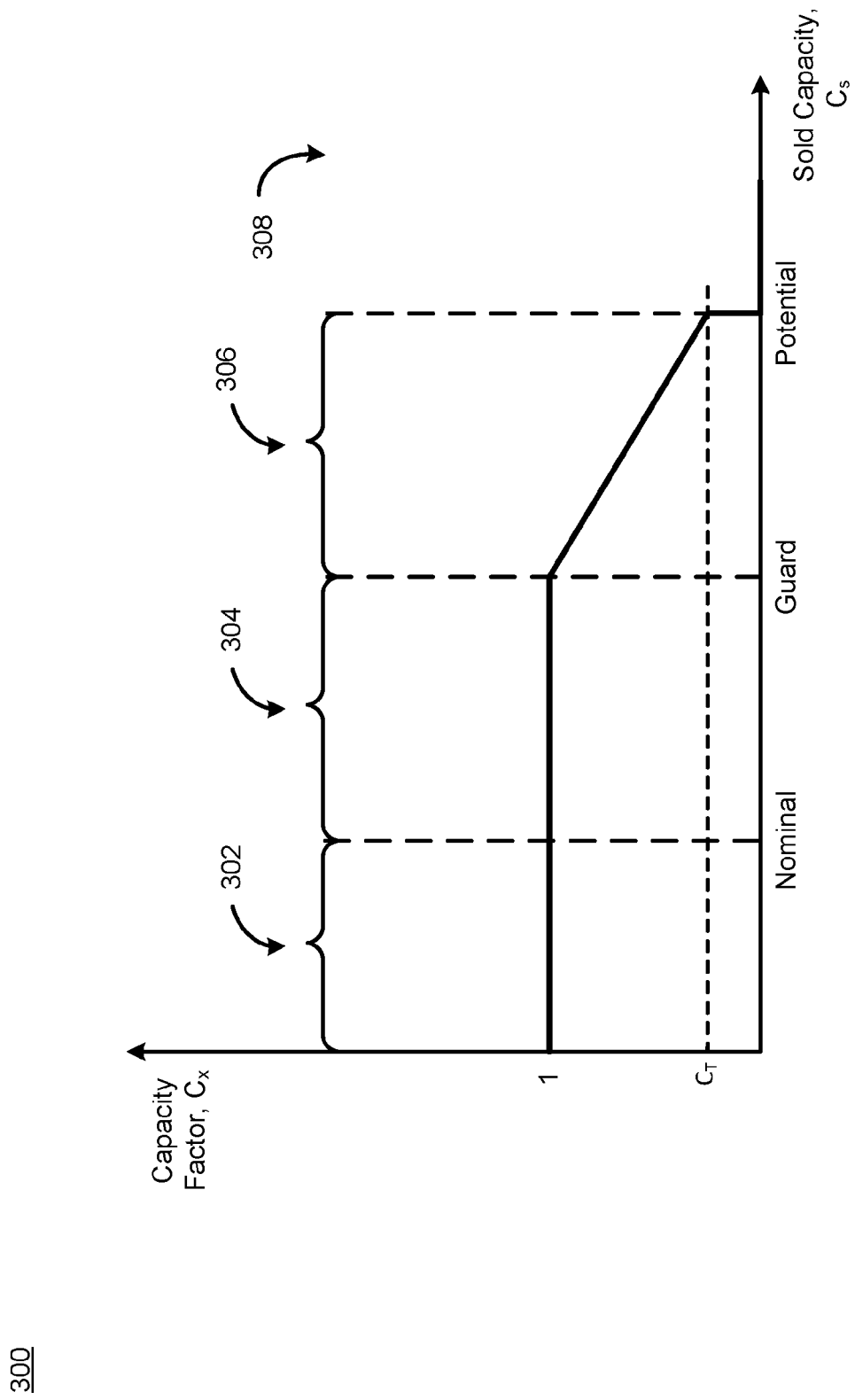
FIG. 3 illustrates a plot depicting an example relationship between a capacity factor and sold capacity in accordance with certain embodiments.

FIG. 3 illustrates a plot 300 depicting this example relationship between a capacity factor $C_x$ and sold capacity $C_s$ in accordance with certain embodiments. The vertical axis of plot 300 corresponds to the capacity factor, $C_x$, and the horizontal axis corresponds to sold capacity, $C_s$. Plot 300 includes four regions 302, 304, 306 and 308. The first region 302 corresponds to sold capacity between zero and the nominal capacity. In other words, the first region 202 corresponds to an under-allocated computing infrastructure node. The second region 304 corresponds to a sold capacity greater than the nominal capacity but less than a guard capacity. Operation in the second region 304 corresponds to oversold capacity, i.e., the capacity is over-allocated but not considered a risk. For both the first region 302 and the second region 304, the capacity factor $C_x$ is equal to one. Thus, during operation in these two regions 302 and 304, the associated availability score for the node (as described below) may not be reduced by the capacity factor.

The third region 306 corresponds to a sold capacity greater than the guard capacity but less than a potential capacity. The capacity factor in the third region 306 decreases from one to a capacity threshold, $C_T$. Operation in the third region 306 corresponds to increasingly oversold capacity, increasing risk and, thus, decreasing capacity factor and correspondingly decreasing the availability score of the node. The fourth region 308 corresponds to sold capacity greater than potential capacity, i.e., greater than allowed. In this fourth region, the capacity factor is zero and the availability score of the node will be zero. In other words, a node (e.g., a physical element or logical machine) with a zero capacity factor and a corresponding score of zero may not be selected for workload placement.

Thus, the capacity factor may be equal to one for sold capacity less than or equal to the guard capacity. The capacity factor may decrease linearly, to a threshold capacity, $C_T$, as sold capacity increases from the guard capacity to the potential capacity. A rate of decrease, i.e., a slope, is related to the capacity threshold, $C_T$, and the relative values of the guard factor and the potential factor. Sold capacity greater than the guard capacity represents an increasing risk of SLA violations as sold capacity increases from the guard capacity to the potential capacity. As shown below, this increasing risk may be represented in the availability score of a node by a corresponding decrease in the availability score as the sold capacity increases and the capacity factor decreases correspondingly.

Accordingly, the capacity factor may be set to one for sold capacity between zero and the guard capacity. The capacity factor may decrease, e.g., linearly, from one to a threshold capacity for sold capacity between the guard capacity and the potential capacity. The capacity factor may be equal to zero for sold capacity greater than the potential capacity.

In various embodiments, if one or more parameters upon which the capacity factor is based is unavailable (e.g., a nominal capacity of a virtual machine may be unavailable), the capacity factor may be set to a default value, such as one.

An availability score of a node may be based on one or more utilization parameters, saturation parameters, and/or capacity parameters. In one embodiment, an availability score of a node x is generated as $$Sc_x^{t_1-t_2} = (1 - S_x^{t_1-t_2}) * \frac{C_x}{1 + U_x^{t_1-t_2}}$$

where $Sc_x^{t_1-t_2}$ is the availability score of node x in a time period $t_1$-$t_2$, $S_x^{t_1-t_2}$ is saturation of node x in a time period $t_1$-$t_2$, $C_x$ is the capacity factor, and $U_x^{t_1-t_2}$ is utilization of node x in a time period $t_1$-$t_2$. This score may indicate the "busyness" of a node. Although any suitable scale may be used, if the availability score is scaled between zero and one, then zero means not available and one means highly available.

In various embodiments, an availability score for a logical machine may be determined based, at least in part, on the availability scores of the physical elements included in and/or in proximity to the corresponding configured logical machine. For example, the availability score of the logical machine may be an average of the availability scores of the physical elements. In another example, the availability score of the logical machine may be a weighted combination, e.g., weighted average, of the element scores. In yet another example, the availability score of a logical machine might be the minimum availability score (or maximum availability score) of its constituent elements. Similarly, the availability score for a virtual machine may be based, at least in part, on the availability scores of virtual resources utilized by the virtual machine (e.g., virtual processor, virtual NIC, etc.) which may be calculated in a manner similar to that described herein with respect to availability scores for physical elements. The availability score for a virtual machine may be based on any suitable combination of availability scores (or underlying parameters) of the virtual resources (e.g., average, weighted average, max, min, etc.). In particular embodiments, availability scores for services could be based on the requests received by the service (and corresponding utilization, saturation, and/or capacity measurements).

In particular embodiments, after availability scores are calculated for various nodes, one or more edge tension scores are calculated for links between the nodes. If the combined availability of two connected nodes can be shown by multiplying their availability scores, then this combined availability score is the availability of the edge that exists between the two nodes. However, this combined availability score does not explicitly indicate the cost of traversal between the two connected nodes in the graph model. In various embodiments, a maximum availability score of an edge is set (e.g., to one or other suitable value) and the combined availability score of the associated nodes is subtracted from the maximum availability score to yield an edge tension score. Thus, in an embodiment, the edge tension score is generated as $$St_{x-y}^{t_1-t_2} = S_t - (Sc_x^{t_1-t_2} * Sc_y^{t_1-t_2})$$

where $St_{x-y}^{t_1-t_2}$ is the edge tension score between node x and node y in a time period $t_1$-$t_2$, $S_t$ is the maximum possible edge tension score (which may be one in some embodiments) and $Sc_x^{t_1-t_2} * Sc_y^{t_1-t_2}$ is the combined availability score. This edge tension score provides a measure of the tension between two connected nodes (e.g., the cost of traversal between two connected nodes), as the tension between two connected nodes is inversely proportional to the combined availability score of the nodes associated with an edge.

In other embodiments, an availability score and/or edge tension score may be calculated in any suitable manner and based on any suitable parameters. For example, an availability score of a node could simply be the utilization of the node and the edge tension score between a first node and a second node could be a maximum edge tension score (e.g., one) minus the product of the utilization of the first node and the utilization of the second node. Various other schemes may be used for calculating an availability score and/or edge tension score.

Figure 4:
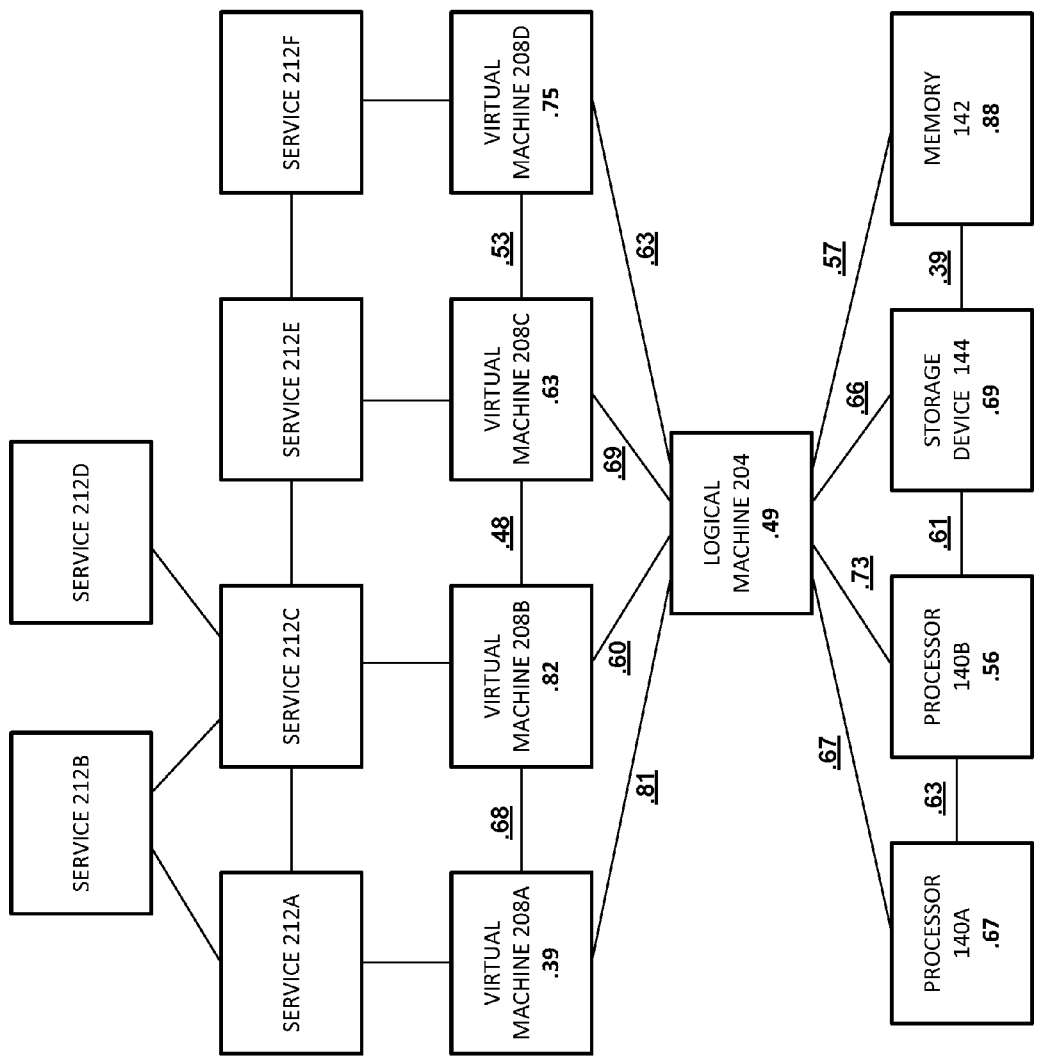
FIG. 4 illustrates an example portion of a graph model of a portion of a computing infrastructure and edge tension scores for links between computing infrastructure nodes in accordance with certain embodiments.

FIG. 4 illustrates an example portion of a graph model 400 of a portion of a computing infrastructure 104 and edge tension scores for links between computing infrastructure nodes in accordance with certain embodiments. In the embodiment indicated, each node in the physical, allocation, and virtual layers includes an availability score. For example, the availability score of virtual machine 208A is 0.39, the availability score of logical machine 204 is 0.49, the availability score of processor 140A is 0.67, and so on. The links between the computing infrastructure nodes include associated edge tension scores. For example, the link between processor 140B and storage device 144 has a tension score of 0.61, while the link between storage device 144 and memory 142 has a lower edge tension score of 0.39 (due to the high availability score of memory 142 relative to the lower availability score of processor 140B). Accordingly, the edge tension scores may indicate that data may be more easily passed between memory 142 and storage device 144 than between storage device 144 and processor 140B.

The graph model 400 is for illustrative purposes only, and various embodiments may include additional information. For example, the graph model 400 does not show all possible edge tension scores. As an example, edge tension scores may also be calculated for a link between processor 140A and storage device 144, between processor 140A and memory 142, between processor 140B and memory 142, and so on.

The saturation, utilization, and capacity parameters may be determined, e.g., periodically, at each expiration of a data acquisition interval. For example, a duration of the data acquisition interval may be on the order of ones of minutes. In another example, the duration of the data acquisition interval may be less than one minute. In another example the duration of the data acquisition interval may be greater than or equal to 10 minutes. The saturation, utilization, and capacity parameters determined at the expiration of each data acquisition interval may be determined for a look back period. The look back period corresponds to a sliding window in which samples related to the saturation, utilization, and capacity parameters are captured and averaged to determine the saturation, utilization, and capacity parameters. For example, a duration of the look back period may be 10 minutes. In another example, the duration of the look back period may be greater than or less than ten minutes. A number of samples captured during the look back period is related to a sample interval. The sample interval corresponds to an amount of time elapsed between samples. Thus, the saturation, utilization, and capacity parameters may be determined at the expiration of each data acquisition interval based on the number of samples captured at the sample intervals during the look back period that preceded the expiration of the data acquisition interval.

Thus, availability and edge tension scores may be determined periodically and/or intermittently for one or more computing infrastructure nodes, based at least in part, on saturation, utilization, and/or capacity parameters. The scores may be stored to data store 130 and/or graph model 110. The score may be determined based, at least in part, on acquired telemetry data. In various embodiments, the availability and edge tension scores may be in the range of zero to one. The availability score may decrease as saturation increases, utilization increases, and/or capacity decreases. A score of zero corresponds to a node that is unavailable to receive a workload.

The scores for the nodes and edges may be determined by, e.g., scoring logic 128, and may be associated with the corresponding nodes and edges and stored to, e.g., data store 130. Score determination and ranking of nodes may be performed periodically and/or intermittently (e.g., in response to generation of an additional workload or a determination that workloads should be relocated).

In various embodiments, scoring logic 128 and/or orchestrator 106 may also rank nodes for workload placement or other purposes (e.g., capacity planning or rebalancing activities including killing or migrating workloads or services or tuning elements on the virtual layer) based on their availability scores and/or edge tension scores. In various embodiments, nodes may be selected for ranking based, at least in part, on available capacity and/or tensions with one or more neighboring nodes, and based, at least in part, on associated features. Whether a node selected for ranking is then selected to receive a workload may be based, at least in part, on the node's availability score and/or edge tensions score(s) in comparison to other nodes' availability scores and/or edge tension scores. Selection of one or more nodes may be performed at initial placement of a workload and/or during operation, e.g., in response to a rebalancing.

Figure 5:
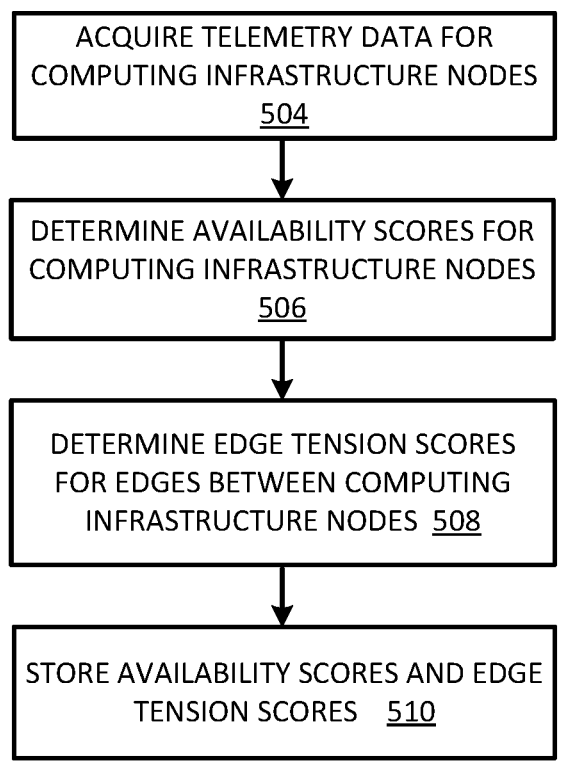
FIG. 5 illustrates a flowchart depicting example operations of a flow for collecting telemetry information and generating edge tension scores for links between computing infrastructure nodes in accordance with certain embodiments.

FIG. 5 illustrates a flowchart depicting example operations of a flow 500 for collecting telemetry information and generating edge tension scores for links between computing infrastructure nodes in accordance with certain embodiments. In an embodiment, one or more operations of flow 500 may be performed, e.g., by scoring engine 104 or other suitable entity of system 100. In some embodiments, operations of flowchart 500 may be performed generally continuously to update rankings. The operations may be performed for example by scoring logic 128 and/or orchestrator 106.

Telemetry data may be acquired for computing infrastructure nodes at operation 504. For example, telemetry data may be acquired from telemetry engine 116. An availability score may be determined for each node of a plurality of nodes at operation 506. The availability score may be determined for any suitable subset of the computing infrastructure nodes or for all of the computing infrastructure nodes. Edge tension scores for edges between computing infrastructure nodes are determined at operation 508. The edge tension scores may be determined for any suitable edges between computing infrastructure nodes. For example, edge tension scores may be calculated for the edges between nodes for which availability scores were determined at operation 506 or any suitable subset thereof. The availability scores and edge tension scores are stored at operation 510. For example, the scores may be stored to graph model 110 and/or data store 130. Thus, any suitable nodes may be ranked generally periodically.

Some of the operations illustrated in FIG. 5 may be repeated, combined, modified or deleted where appropriate, and additional operations may also be added to the flowchart. Additionally, operations may be performed in any suitable order without departing from the scope of particular embodiments.

Figure 6:
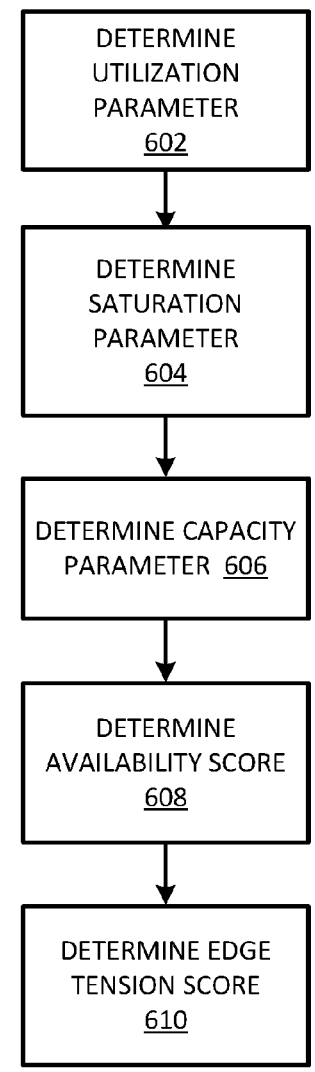
FIG. 6 illustrates a flowchart depicting example operations of a flow for generating an edge tension score in accordance with certain embodiments.

FIG. 6 illustrates a flowchart depicting example operations of a flow 600 for generating an edge tension score in accordance with certain embodiments. The operations may be performed, for example, by scoring logic 128 and/or orchestrator 106. Operations of this embodiment may begin with determining a utilization parameter of a computing infrastructure node at operation 602. Operation 604 includes determining a saturation parameter of the computing infrastructure node. A capacity parameter (e.g., capacity factor, $C_x$ may be determined at operation 606. An availability score may then be determined at operation 608 based, at least in part, on the utilization, saturation, and capacity parameters. At operation 610, an edge tension score is determined. For example, an edge tension score for a link between the computing infrastructure node and another computing infrastructure node may be generated based on the availability score of the node and an availability score of the other computing infrastructure node.

Some of the operations illustrated in FIG. 6 may be repeated, combined, modified or deleted where appropriate, and additional operations may also be added to the flowchart. Additionally, operations may be performed in any suitable order without departing from the scope of particular embodiments.

Figure 7:
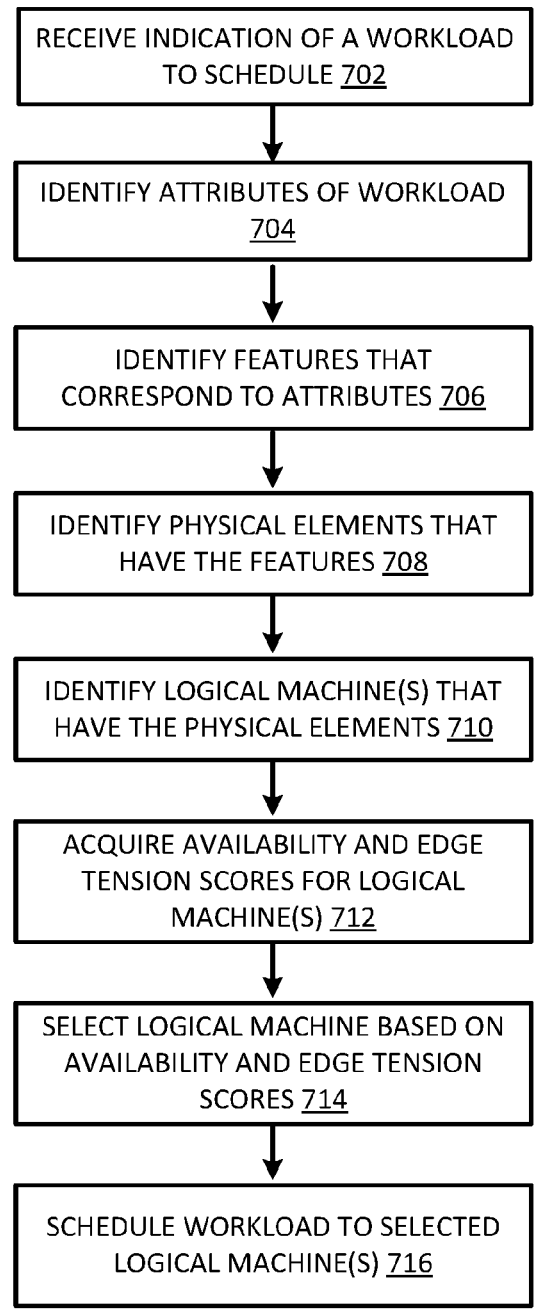
FIG. 7 illustrates a flowchart depicting example operations of a flow for scheduling workloads based on edge tension scores in accordance with certain embodiments.

FIG. 7 illustrates a flowchart depicting example operations of a flow 700 for scheduling workloads based on edge tension scores in accordance with certain embodiments. In an embodiment, one or more operations of flow 700 may be performed by one or more of filter logic 126, scoring logic 128, and orchestrator 106, or other suitable entity. Operations of this embodiment may begin with receiving an indication of a workload to schedule at operation 702. Attributes of the workload may be identified at operation 704. Operation 706 includes identifying features that correspond to the attributes. For example, the features may be associated with one or more physical elements included in a computing infrastructure, e.g., computing infrastructure 104. Physical elements that have the features may be identified at operation 708. One or more logical machines that have the physical elements may be identified at operation 710. Availability and edge tension scores for the one or more logical machines are acquired at operation 712. A logical machine is then selected based on its availability score and/or one or more edge tension scores of links between the logical machine and one or more neighboring computing infrastructure nodes at step 714. The received workload may be scheduled (i.e., placed) to the selected logical machine at operation 716.

Some of the operations illustrated in FIG. 7 may be repeated, combined, modified or deleted where appropriate, and additional operations may also be added to the flowchart. Additionally, operations may be performed in any suitable order without departing from the scope of particular embodiments.

"Logic" (e.g., as found in filter logic 126 scoring logic 128, or in other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module or engine as used herein refers to any combination of hardware, software, and/or firmware. As an example, a module or engine may include hardware, such as a micro-controller, associated with a non-transitory medium to store code adapted to be executed by the micro-controller. Therefore, reference to a module or engine, in one embodiment, refers to the hardware, which is specifically configured to recognize and/or execute the code to be held on a non-transitory medium. Furthermore, in another embodiment, use of a module or engine refers to the non-transitory medium including the code, which is specifically adapted to be executed by the microcontroller to perform predetermined operations. And as can be inferred, in yet another embodiment, the term module or engine (in this example) may refer to the combination of the microcontroller and the non-transitory medium. Often module or engine boundaries that are illustrated as separate commonly vary and potentially overlap. For example, a first and a second module or engine may share hardware, software, firmware, or a combination thereof, while potentially retaining some independent hardware, software, or firmware. In various embodiments, a module or engine may include any suitable logic.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 418A0 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

An example embodiment includes a system for measuring the tension levels between computing infrastructure nodes. The system comprises a scoring engine comprising at least one processor and memory. The scoring engine is to generate, based on telemetry information obtained from a plurality of nodes of a computing infrastructure, a first availability score for a first node of the plurality of computing infrastructure nodes and a second availability score for a second node of the plurality of computing infrastructure nodes; and generate, based on the first availability score of the first computing infrastructure node and the second availability score of the second computing infrastructure node, an edge tension score for a link between the first node and the second node.

In an embodiment, the scoring engine is further to provide the edge tension score to an orchestrator to be used to determine placement of a workload in the computing infrastructure. In an embodiment, the system further comprises a telemetry engine to obtain the telemetry information from the plurality of computing infrastructure nodes. In an embodiment, the edge tension score is generated by subtracting a product of the first availability score and the second availability score from a maximum possible edge tension score. In an embodiment, the first node is a first physical element of the computing infrastructure and the second node is a second physical element of the computing infrastructure. In an embodiment, the first node is a first physical element of the computing infrastructure and the second node is a second physical element of the computing infrastructure. In an embodiment, the first node is a first physical element of the computing infrastructure and the second node is a logical machine associated with the first physical element and at least one additional physical element of the computing infrastructure. In an embodiment, the first availability score is based on at least one utilization parameter associated with the first computing infrastructure node. In an embodiment, the first availability score is based on at least one saturation parameter associated with the first computing infrastructure node. In an embodiment, the first availability score is based on at least one capacity parameter associated with the first computing infrastructure node. In an embodiment, the at least one capacity parameter includes a sold capacity associated with the first computing infrastructure node. In an embodiment, the first availability score is based on at least one utilization parameter, at least one saturation parameter, and at least one capacity parameter associated with the first computing infrastructure node. In an embodiment, the edge tension score is inversely proportional to the first availability score and the second availability score.

An example embodiment includes a method for measuring the tension levels between computing infrastructure nodes. The method comprises generating, based on telemetry information obtained from a plurality of nodes of a computing infrastructure, a first availability score for a first node of the plurality of computing infrastructure nodes and a second availability score for a second node of the plurality of computing infrastructure nodes; and generating, based on the first availability score of the first computing infrastructure node and the second availability score of the second computing infrastructure node, an edge tension score for a link between the first node and the second node.

In an embodiment, the method further comprises providing the edge tension score to an orchestrator to be used to determine placement of a workload in the computing infrastructure. In an embodiment, the method further comprises obtaining, by a telemetry engine, the telemetry information from the plurality of computing infrastructure nodes. In an embodiment, the edge tension score is generated by subtracting a product of the first availability score and the second availability score from a maximum possible edge tension score. In an embodiment, the first node is a first physical element of the computing infrastructure and the second node is a second physical element of the computing infrastructure. In an embodiment, the first node is a first physical element of the computing infrastructure and the second node is a logical machine associated with the first physical element and at least one additional physical element of the computing infrastructure. In an embodiment, the first availability score is based on at least one utilization parameter associated with the first computing infrastructure node. In an embodiment, the first availability score is based on at least one saturation parameter associated with the first computing infrastructure node. In an embodiment, the first availability score is based on at least one capacity parameter associated with the first computing infrastructure node. In an embodiment, the at least one capacity parameter includes a sold capacity associated with the first computing infrastructure node. In an embodiment, the first availability score is based on at least one utilization parameter, at least one saturation parameter, and at least one capacity parameter associated with the first computing infrastructure node. In an embodiment, the edge tension score is inversely proportional to the first availability score and the second availability score.

An example embodiment includes at least one machine readable storage medium having instructions stored thereon. The instructions when executed by a machine are to cause the machine to generate, based on telemetry information obtained from a plurality of nodes of a computing infrastructure, a first availability score for a first node of the plurality of computing infrastructure nodes and a second availability score for a second node of the plurality of computing infrastructure nodes; and generate, based on the first availability score of the first computing infrastructure node and the second availability score of the second computing infrastructure node, an edge tension score for a link between the first node and the second node.

In an embodiment, the instructions are further to cause the machine to provide the edge tension score to an orchestrator to be used to determine placement of a workload in the computing infrastructure. In an embodiment, the instructions are further to cause the machine to obtain the telemetry information from the plurality of computing infrastructure nodes. In an embodiment, the edge tension score is generated by subtracting a product of the first availability score and the second availability score from a maximum possible edge tension score. In an embodiment, the first node is a first physical element of the computing infrastructure and the second node is a second physical element of the computing infrastructure. In an embodiment, the first node is a first physical element of the computing infrastructure and the second node is a logical machine associated with the first physical element and at least one additional physical element of the computing infrastructure. In an embodiment, the first availability score is based on at least one utilization parameter associated with the first computing infrastructure node. In an embodiment, the first availability score is based on at least one saturation parameter associated with the first computing infrastructure node. In an embodiment, the first availability score is based on at least one capacity parameter associated with the first computing infrastructure node. In an embodiment, the at least one capacity parameter includes a sold capacity associated with the first computing infrastructure node. In an embodiment, the first availability score is based on at least one utilization parameter, at least one saturation parameter, and at least one capacity parameter associated with the first computing infrastructure node. In an embodiment, the edge tension score is inversely proportional to the first availability score and the second availability score.

An example embodiment includes an apparatus comprising means for generating, based on telemetry information obtained from a plurality of nodes of a computing infrastructure, a first availability score for a first node of the plurality of computing infrastructure nodes and a second availability score for a second node of the plurality of computing infrastructure nodes; and generating, based on the first availability score of the first computing infrastructure node and the second availability score of the second computing infrastructure node, an edge tension score for a link between the first node and the second node.

In an embodiment, the apparatus further comprises means for providing the edge tension score to an orchestrator to be used to determine placement of a workload in the computing infrastructure. In an embodiment, the instructions are further to cause the machine to obtain the telemetry information from the plurality of computing infrastructure nodes. In an embodiment, the edge tension score is generated by subtracting a product of the first availability score and the second availability score from a maximum possible edge tension score. In an embodiment, the first node is a first physical element of the computing infrastructure and the second node is a second physical element of the computing infrastructure. In an embodiment, the first node is a first physical element of the computing infrastructure and the second node is a logical machine associated with the first physical element and at least one additional physical element of the computing infrastructure. In an embodiment, the first availability score is based on at least one utilization parameter associated with the first computing infrastructure node. In an embodiment, the first availability score is based on at least one saturation parameter associated with the first computing infrastructure node. In an embodiment, the first availability score is based on at least one capacity parameter associated with the first computing infrastructure node. In an embodiment, the at least one capacity parameter includes a sold capacity associated with the first computing infrastructure node. In an embodiment, the first availability score is based on at least one utilization parameter, at least one saturation parameter, and at least one capacity parameter associated with the first computing infrastructure node. In an embodiment, the edge tension score is inversely proportional to the first availability score and the second availability score.

An example embodiment includes a system comprising a telemetry engine to obtain telemetry information from a plurality of nodes of a computing infrastructure; a scoring engine comprising at least one processor and memory, the scoring engine to generate, based on the telemetry information, a first availability score for a first node of the plurality of computing infrastructure nodes and a second availability score for a second node of the plurality of computing infrastructure nodes; and generate, based on the first availability score of the first computing infrastructure node and the second availability score of the second computing infrastructure node, an edge tension score for a link between the first node and the second node; and an orchestrator to direct the placement of at least one workload based on the edge tension score.

In an embodiment, the directing the placement of the at least one workload comprises migrating the at least one workload from one logical machine to another logical machine. In an embodiment, the directing the placement of the at least one workload comprises initially placing the at least one workload at one or more logical machines.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
    a scoring engine comprising at least one processor and memory, the scoring engine to:
        generate, based on telemetry information obtained from a plurality of nodes of a computing infrastructure, a first availability score for a first node of the plurality of computing infrastructure nodes and a second availability score for a second node of the plurality of computing infrastructure nodes; and
        generate, based on the first availability score of the first computing infrastructure node and the second availability score of the second computing infrastructure node, an edge tension score for a link between the first node and the second node, wherein the edge tension score is based at least in part on a product of the first availability score and the second availability score.

2. The system of claim 1, the scoring engine further to provide the edge tension score to an orchestrator to be used to determine placement of a workload in the computing infrastructure.

3. The system of claim 1, further comprising a telemetry engine to obtain the telemetry information from the plurality of computing infrastructure nodes.

4. The system of claim 1, wherein the edge tension score is generated by subtracting a product of the first availability score and the second availability score from a maximum possible edge tension score.

5. The system of claim 1, wherein the first node is a first physical element of the computing infrastructure and the second node is a second physical element of the computing infrastructure.

6. The system of claim 1, wherein the first node is a first physical element of the computing infrastructure and the second node is a logical machine associated with the first physical element and at least one additional physical element of the computing infrastructure.

7. The system of claim 1, wherein the first availability score is based on at least one utilization parameter associated with the first computing infrastructure node.

8. The system of claim 1, wherein the first availability score is based on at least one saturation parameter associated with the first computing infrastructure node.

9. The system of claim 1, wherein the first availability score is based on at least one capacity parameter associated with the first computing infrastructure node.

10. The system of claim 9, wherein the at least one capacity parameter includes a sold capacity associated with the first computing infrastructure node.

11. The system of claim 1, wherein the first availability score is based on at least one utilization parameter, at least one saturation parameter, and at least one capacity parameter associated with the first computing infrastructure node.

12. The system of claim 1, wherein the edge tension score is inversely proportional to the first availability score and the second availability score.

13. A method comprising:
generating, based on telemetry information obtained from a plurality of nodes of a computing infrastructure, a first availability score for a first node of the plurality of computing infrastructure nodes and a second availability score for a second node of the plurality of computing infrastructure nodes;
generating, based on the first availability score of the first computing infrastructure node and the second availability score of the second computing infrastructure node, an edge tension score for a link between the first node and the second node, wherein the edge tension score is based at least in part on a product of the first availability score and the second availability score; and
providing the edge tension score to an orchestrator to be used to determine placement of a workload in the computing infrastructure.

14. The method of claim 13, wherein the edge tension score is generated by subtracting a product of the first availability score and the second availability score from a maximum possible edge tension score.

15. The method of claim 13, wherein the first availability score is based on at least one saturation parameter associated with the first computing infrastructure node.

16. The method of claim 13, wherein the first availability score is based on at least one capacity parameter associated with the first computing infrastructure node.

17. At least one non-transitory machine readable storage medium having instructions stored thereon, the instructions when executed by a machine to cause the machine to:
generate, based on telemetry information obtained from a plurality of nodes of a computing infrastructure, a first availability score for a first node of the plurality of computing infrastructure nodes and a second availability score for a second node of the plurality of computing infrastructure nodes; and
generate, based on the first availability score of the first computing infrastructure node and the second availability score of the second computing infrastructure node, an edge tension score for a link between the first node and the second node, wherein the edge tension score is based at least in part on a product of the first availability score and the second availability score.

18. The at least one medium of claim 17, wherein the edge tension score is generated by subtracting a product of the first availability score and the second availability score from a maximum possible edge tension score.

19. The at least one medium of claim 17, wherein the first availability score is based on at least one saturation parameter associated with the first computing infrastructure node.

20. The at least one medium of claim 17, wherein the first availability score is based on at least one capacity parameter associated with the first computing infrastructure node.

21. A system comprising:
a computing infrastructure comprising a plurality of nodes;
a telemetry engine to obtain telemetry information from a plurality of nodes of a computing infrastructure;
a scoring engine comprising at least one processor and memory, the scoring engine to:
generate, based on the telemetry information, a first availability score for a first node of the plurality of computing infrastructure nodes and a second availability score for a second node of the plurality of computing infrastructure nodes; and
generate, based on the first availability score of the first computing infrastructure node and the second availability score of the second computing infrastructure node, an edge tension score for a link between the first node and the second node, wherein the edge tension score is based at least in part on a product of the first availability score and the second availability score; and
an orchestrator to direct the placement of at least one workload based on the edge tension score.

22. The system of claim 21, wherein the directing the placement of the at least one workload comprises migrating the at least one workload from one logical machine to another logical machine.

23. The system of claim 21, wherein the directing the placement of the at least one workload comprises initially placing the at least one workload at one or more logical machines.

24. The system of claim 21, wherein the edge tension score is generated by subtracting a product of the first availability score and the second availability score from a maximum possible edge tension score.

25. The system of claim 21, wherein the first availability score is based on at least one saturation parameter associated with the first computing infrastructure node.

26. An apparatus comprising:
means for:
generating, based on telemetry information obtained from a plurality of nodes of a computing infrastructure, a first availability score for a first node of the plurality of computing infrastructure nodes and a second availability score for a second node of the plurality of computing infrastructure nodes; and
generating, based on the first availability score of the first computing infrastructure node and the second availability score of the second computing infrastructure node, an edge tension score for a link between the first node and the second node, wherein the edge tension score is based at least in part on a product of the first availability score and the second availability score.

27. The apparatus of claim 26, wherein the first availability score is based on at least one saturation parameter associated with the first computing infrastructure node.

28. The apparatus of claim 26, wherein the first availability score is based on at least one capacity parameter associated with the first computing infrastructure node.

* * * * *